United States Patent Office 3,543,508
Patented Dec. 1, 1970

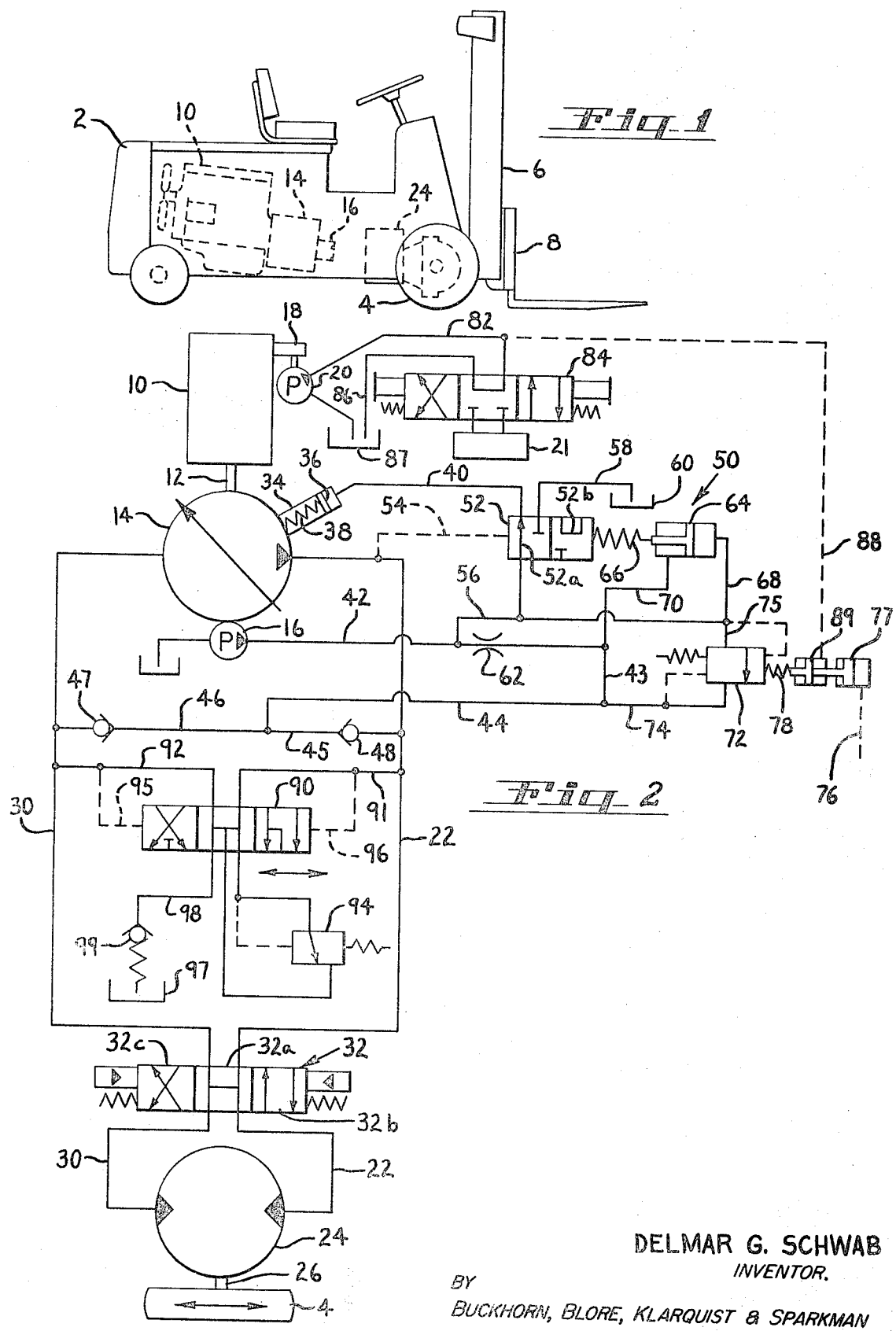

3,543,508
HYDROSTATIC TRANSMISSION WITH PRESSURE CONTROL
Delmar G. Schwab, Portland, Oreg., assignor to Hyster Company, Portland, Oreg., a corporation of Nevada
Filed Oct. 16, 1968, Ser. No. 768,098
Int. Cl. F15b *15/18;* F16d *31/02*
U.S. Cl. 60—19                                    32 Claims

ABSTRACT OF THE DISCLOSURE

A hydrostatic transmission system suitable for driving a traction vehicle. The system includes an engine driven variable displacement pump which delivers pressure fluid to a fluid motor for transmitting torque to the driving wheels of the vehicle. A pressure control for controlling pump displacement is sensitive both to the pressure produced by the variable displacement pump and the speed of the engine in a manner so that increases in pump pressures tend to reduce pump displacement and so that increases in engine speed tend to increase pump displacement and increase the magnitude of pump pressure required to minimize pump displacement.

BACKGROUND OF THE INVENTION

Field of the invention

The present application relates to hydrostatic transmission and more particularly to a hydrostatic transmission for driving a traction vehicle.

Description of the prior art

Prior known hydraulic transmission systems fall into the following three general categories:

(1) Hydraulic transmission with torque converter.—This type of transmission is presently in use to drive different types of vehicles including industrial lift trucks and automobiles. The torque converter is a hydrodynamic system and has disadvantages in that it is expensive and relatively inefficient. The torque converter absorbs a large percentage of engine power while the vehicle is not moving, includes mechanical drive train components which limit the flexibility of drive train layout and take up space, has poor acceleration, and does not limit applied torque at low vehicle speeds and so can cause wheel spinning. However, the torque converter transmission does have certain desirable performance characteristics which a successful hydrostatic transmission for certain traction drive vehicles such as lift trucks should also possess such as the capability of high engine speed at low vehicle speeds, smooth controlled acceleration and deceleration, and built-in anti-stall characteristics.

(2) Stroke-controlled hydrostatic traction drive transmission.—Simple versions of these systems have recently been used in construction machinery and farm equipment. In such systems, an engine drives a variable displacement pump which supplies pressure fluid to a fluid traction motor for driving the vehicle wheels. However, in normal operation of these transmissions the stroke or displacement of the pump is controlled solely by engine speed in a manner so that pump displacement increases and decreases with increases and decreases in engine speed. Thus there is normally only one pump displacement for any given engine speed, regardless of system pressure in the pump circuit. This is a satisfactory type of transmission for use in road rollers and farm tractors where speed control rather than power control is of primary importance. However, it is unsatisfactory for driving other types of vehicles where control of system pressure is of primary importance. In such transmissions, system pressures are uncontrolled except when pressure becomes so high that it threatens to stall the engine. Then a manual or automatic pressure compensating override may come into play to cut back pump displacement to prevent engine stalling.

Disadvantages of stroke-controlled transmissions for use as a traction drive include the possibility of drive line and tire abuse due to abrupt uncontrollable changes in wheel torque from small changes in engine speed, inability to maintain high engine speeds at low vehicle speeds, inability to have high engine speeds and high torque transmission to the traction wheels at low vehicle speed in the absence of a manual override for displacement control, and abrupt deceleration which is hard on both the operator and the machine. Other disadvantages include the inability to inch the vehicle precisely and easily at high and low engine speeds because of the interdependence of vehicle speed and engine speed, inability to deliver maximum system pressures and thus maximum torque at low vehicle speeds, and the inability to deliver a variable but controlled system pressure and tractive effort at a given vehicle speed by varying engine speed.

(3) Pressure-controlled hydrostatic transmissions for tools.—These systems have been suggested to drive vehicle cooling fans and other auxiliary hydraulic equipment. However, because such systems have their pressure control or compensator setting determined by demand pressure of the hydraulic components to be driven, they are not suitable for use as a traction drive for vehicles.

SUMMARY OF THE INVENTION

The present invention comprises a hydrostatic transmission which includes an infinitely variable displacement fluid-pumping agency whose displacement is determined by system presure through a pressure compensator control, the setting of which is determined by the speed of the engine which drives the pump. The transmission system is particularly suited as a traction drive for a vehicle such as an industrial lift truck because of its efficient utilization of engine power, and precise control and variation of tractive effort to the wheels at different vehicle speeds by varying engine speed through a predetermined speed range.

Principal objects of the invention are to provide a hydrostatic transmission and control therefor having the following advantages and characteristics:

(1) Suitability for use as a traction drive for a vehicle;
(2) System pressure control of pump displacement;
(3) Modulation of the pressure-controlling pump displacement with engine speed;
(4) Smooth acceleration and deceleration approaching those characteristics of a torque converter;
(5) Capability of attaining high engine speeds at low vehicle speeds;
(6) Control and attainment of variable tractive effort by varying engine speed;
(7) Availabiilty of maximum tractive effort at low vehicle speeds;
(8) Elimination of abrupt and uncontrolled changes in tractive effort;
(9) Efficiency exceeding that of a torque converter transmission making most engine power available for auxiliary equipment when desired;
(10) Precise inching control;
(11) Inherent anti-stall characteristics similar to those of a torque converter;
(12) Flexibility of drive train layout because of elimination of mechanical drive train components required by mechanical transmissions and power shift transmissions having torque converters;

(13) Conservation of space;

(14) Ability to modify performance characteristics with minimum effort and expense;

(15) Rapid acceleration;

(16) Limitation of maximum torque values at low vehicle speeds to prevent wheel spin-out; and

(17) Control of the displacement of multiple infinitely variable displacement pumping agencies of the transmission with a single engine-speed modulated pressure compensator control.

BRIEF DESCRIPTION OF THE DRAWINGS

The foregoing and other objects and advantages of the present invention will become more apparent from the following detailed description which proceeds with reference to the accompanying drawing wherein:

FIG. 1 is an elevational view of a lift truck incorporating a hydrostatic transmission in accordance with the present invention;

FIG. 2 is a diagrammatic view of a hydrostatic transmission system for a traction vehicle, including hydraulic circuitry and components, embodying the present invention.

DETAILED DESCRIPTION

General arrangement

With reference to the drawing, the transmission system of the present invenion is shown in FIG. 1 mounted in a lift truck 2 having drive wheels 4, the usual upright 6 and load carriage 8. Referring to both FIGS. 1 and 2, the transmission includes an internal combustion engine 10 which drives through a drive line 12, a variable displacement pump 14, and a fixed displacement charge pump 16. The engine also drives through drive line 18 an auxiliary fixed or variable displacement pump 20 for supplying pressure fluid to hydraulic accessories 21. Primary pump 14 is in a closed loop hydraulic circuit including a line 22 through which pressure fluid is supplied by pump 14 to a variable or fixed displacement fluid traction motor 24 which through a drive line 26 drives the traction wheels 4 of the lift truck. Fluid from motor 24 then returns through line 30 of the closed loop circuit to pump 14. The circuit also includes a directional control valve 32, the operation of which is controlled hydraulically and which has three positions including a spring-centered neutral position 32a as shown, a forward position 32b, and a reverse position 32c in which latter position the direction of flow of pressure fluid through fluid motor 24 is reversed.

Variable displacement pump 14 is preferably of the well-known piston type wherein multiple pumping pistons or other pumping agencies are engaged by a common thrust plate which gives the pistons their reciprocative pumping action. The thrust plate of such pumps has a variable angle which effects simultaneous variation of the strokes of all pistons from a minimum to a maximum within a predetermined displacement range. Such axial piston pumps are well known in the field, and are manufactured by companies such as Vickers Division of Sperry Rand Corporation and Denison Division of Abex Corporation. The angle of the thrust plate of such pumps is varied by a displacement varying means such as the cylinder 34 and piston 36 depicted schematically in FIG. 2. The position of piston 36 is influenced by a spring 38 on one side and pressure fluid admitted to the cylinder through line 40 on the opposite side. Spring 38 biases piston 36 to a position wherein the strokes of the pumping pistons and thus the displacement of the pump will be at a maximum, whereas pressure fluid admitted to the cylinder through line 40 tends to push stroke control piston 36 in the opposite direction to minimize pump displacement. The multiple axial piston type of pump described and other variable displacement pumps having multiple pumping agencies with common displacement varying means have an advantage over other possible types of variable displacement pumps in that displacement is infinitely variable and a single simple control means can be provided for controlling in unison displacement of all of the various pumping pistons or agencies.

Fixed displacement charge pump 16 supplies fluid through lines 42, 43, 44, 45 and 46 to the primary closed loop circuit 22, 30 to ensure that the loop always has sufficient hydraulic fluid. Pressure fluid is delivered by the charge pump to the low pressure side of the closed primary loop through check valves 47, 48 in lines 46 and 45, respectively.

The displacement of pump 14, and thus actuation of the displacement varying means of such pump, is pressure-controlled by a pressure compensator control indicated generally at 50. The pressure compensator includes a control means for controlling the operation of the displacement varying means of the pump comprising a two-position spool valve 52 which is sensitive to system pressure in line 22 through pilot line 54. In the illustrated position of the spool valve, pressure fluid is admitted to cylinder 34 of the displacement varying means of pump 14 through line 42, a line 56, a valve passage 52a of spool valve 52 and line 40 to cut back pump displacement to its minimum displacement setting. In the other position of spool valve 52, fluid pressure at the cylinder 34 of the displacement varying means is relieved through line 40, valve passage 52b and line 58 leading to sump 60 enabling spring 38 to stroke the pump to maximum displacement.

The pressure control furthermore includes a pressure modulating means which influences operation of spool valve 52 in that it determines the magnitude of system pressure acting through line 54 necessary to shift valve 52 to the right to place the variable displacement pump 14 in its minimum displacement condition. This modulating means is sensitive to the speed of engine 10 and senses this speed at orifice 62 in line 42. Since the displacement of charge pump 16 is fixed, the flow rate of fluid through line 42 is directly proportional to engine speed. Thus pressure drop across orifice 62 is proportional to the square of the flow through the orifice and thus proportional to the square of engine speed. The modulating means also includes a piston 64 and a pressure compensator spring 66 extending between the piston and spool valve 52 in opposition to system pressure. Fluid pressure upstream from orifice 62 is transmitted to the right-hand end of piston 64 through lines 56 and 68 while pressure downstream from orifice 62 is transmitted to the opposite end of piston 64 through line 70. Because of the foregoing, the differential pressure acting against piston 64 will be the same as and vary with differential pressure across orifice 62. The differential pressure acting on piston 64 in turn determines the pressure setting of pressure compensator spring 66. Thus at any given time the pressure setting of spring 66 will be a function of engine speed and will vary with the square of engine speed. From the foregoing it will be apparent that the position of control spool 52 at any given time is determined by a combination of system pressure exerted on it through pilot line 54 and engine speed acting as pressure through compensator spring 66.

The transmission system also includes an inching control which can influence the displacement of pump 14. The inching control includes a pressure relief valve 72 connected in the transmission control hydraulic circuit by a line 74 forming an extension of line 44 and by a line 75 forming an extension of line 68 leading to compensator piston 64. Valve 72 is sensitive to hydraulic pressure in brake line 76 acting through a piston 77 which in turn determines the pressure setting of an actuator spring 78 acting against relief valve 72.

The auxiliary hydraulic circuit served by pump 20 delivers pressure fluid through line 82 to a control valve 84 which in turn can direct the pressure fluid either to sump 87 through line 86 or to one or several different hydraulic accessories such as the lift cylinders or tilt cylinders of a lift truck represented by auxiliary fluid motors 21. Valve 84, of course, can have as many positions or consist of as many valve elements as necessary to serve the various hydraulic accessories provided on the vehicle. The auxiliary hydraulic circuit also includes a pilot line 88 leading to hydraulic actuator piston 89 for operating relief valve 72 mentioned previously in connection with the brake inching control. The purpose of the tie-in of the auxiliary hydraulic circuit to relief valve 72 is to give such circuit priority over the traction circuit for the use of engine power by cutting back displacement of pump 14 when there is insufficient engine power for driving the vehicle and operating the hydraulic accessories at the same time. Since the load-handling functions of a lift truck are more important than the driving functions when there is insufficient power for both, the handling functions are given priority.

The traction circuit represented by lines 22 and 30 also includes a shuttle valve 90 connected across lines 22 and 30 by lines 91 and 92. The shuttle valve transmits fluid to a system relief valve 94 to relieve the system in the event of excessively high system pressures. Shuttle valve 90 is balanced between low pressure at one side of the loop and high pressure at the other side of the loop by pilot lines 95, 96 so that the spool always shuttles to the low pressure side of the loop. Thus when pressure in line 22 is higher than pressure in line 30, shuttle valve 90 shifts to the left. However, when pressure in line 30 is higher than that in line 22, as during deceleration, shuttle valve 90 shifts toward the right. In either case, fluid under excessively high pressures is directed through relief valve 94 to the low pressure side of the loop or to sump 97 through line 98 and spring-biased check valve 99.

Check valve 99 serves to limit the maximum magnitude of low pressure in the system at any time by dumping fluid to sump when low pressure exceeds the predetermined maximum low pressure. This predetermined maximum low pressure is below the minimum pressure setting of compensator spring 66 to ensure that during deceleration of the vehicle, the pressure in line 22 will be insufficient to act on control valve 52 so that displacement of pump 14 will be at a maximum.

Operation of transmission

Engine idle.—At idling speeds of engine 10, fixed displacement pump 16 is driven slowly, and therefore the rate of flow through line 42 and through orifice 62 is low. Thus pressure differential across orifice 62 and thus between the opposite ends of compensator piston 64 is slight, and consequently the pressure setting or compression of compensator spring 66 is at a minimum at low idle. Under these conditions it does not take a very high system pressure acting through line 54 to shift control valve 52 toward the right to minimize pump displacement. Thus at low engine speeds, it is impossible to load the engine down to the point where it will stall or to produce any appreciable drive line pressure, and thus any appreciable tractive effort or wheel torque. It will also be apparent, therefore, that at low engine speeds it is not possible to move the vehicle against any normal rolling resistance. For example, in practice at low idling speeds of engine 10, the compensator spring setting 66 might be selected so that pump displacement starts to decrease at about 150 p.s.i. system pressure and reaches minimum pump displacement at 200 p.s.i. system pressure, thereby requiring only a 50 p.s.i. increase in pressure to stroke the pump from maximum to minimum displacement.

High engine speed.—At high engine speed, charge pump 16 is driven proportionately faster than at low engine speed, and thus the flow through line 42 and through orifice 62 will be at a correspondingly faster rate. The pressure drop across valve 62 under high speed conditions is therefore much greater than at low engine speeds, causing a differential of pressure at piston 64 sufficient to exert considerable force against compensator spring 66. At high engine speeds, this force is sufficient to place spring 66 at its maximum pressure setting so that a relatively high system pressure must act through pilot line 54 before control valve 52 will shift to minimize pump displacement. Thus at high engine speeds, high system pressure can be built up to produce high wheel torque. In practice the pressure compensator spring 66 might be selected so that its maximum pressure setting is reached at less than 100 percent engine speed, such as, for example, at 50 percent full engine speed or at any other desired engine speed depending on performance characteristics desired.

Nevertheless, the spring operates in the same way at its maximum pressure setting as it did at its minimum pressure setting to control pump displacement. For example, if spring 66 is selected so that at its maximum setting displacement of pump 14 begins to decrease at about 3,550 p.s.i., minimum displacement is achieved when system pressure reaches 3,600 p.s.i., requiring the same pressure differential of 50 p.s.i. to move the pump displacement from maximum to minimum, as at minimum engine speed.

Acceleration.—Assuming engine 10 is idling at low speed with no load on the engine, it is possible to accelerate the engine to a reaonably high speed very quickly. Because engine power is directly propotional to its speed, optimum engine power will therefore be quickly available for acceleration. As the engine speeds up, the rate of flow through line 42 and across orifice 62 increases also, thereby progressively increasing the pressure setting of compensator spring 66. The increasing force exerted by spring 66 on valve 52 shifts valve 52 toward its left-hand position to relieve fluid pressure at cylinder 34 and thereby maximize pump displacement. Increased pump displacement in turn increases system drive pressure in line 22 and at the traction motor 24, increasing driving torque to the wheels. However, as system drive pressure increases, it acts through line 54 to counteract the increased force exerted by spring 66, tending to shift valve 52 back toward its right-hand position to again cut back pump displacement. Thus the force exterted by compensator spring 66 at any time determines the upper limit of system drive pressure and thus maximum wheel torque that can be developed at any given engine speed. It will be apparent that the higher the engine speed, the higher is the maximum drive pressure that can be developed in the system and therefore the higher the torque levels which can be obtained, so long as engine speed is in the speed range within which compensator spring 66 functions.

To remove the vehicle, it is necessary to increase engine speed from low idle. If a given increase in engine speed does not develop sufficient drive pressure and wheel torque to overcome rolling resistance of the vehicle, pressure in line 54 builds up to a point where it overcomes the force of spring 66 and shifts spool 52 back to its right-hand position to cut back pump displacement and thus limit system pressure. A further increase in engine speed at this point increases the pressure setting of spring 66, enabling a greater system pressure to build up in line 22 and thus a greater torque transmitted to wheels 28 before system pressure again cuts back pump displacement. Through this process engine speed is gradually increased to a level sufficient to produce system pressure and tractive effort high enough to move the vehicle. From this point acceleration and ultimate vehicle speed depends on maintaining drive system pressure, which in turn depends on available engine speed. The entire acceleration cycle is smooth and controlled, with no abrupt changes in acceleration because of the smooth, progressive increase in system drive pressures through controlled increases in engine speed.

An important feature of the transmission system during acceleration in particular, is the torque limiting effect that spring 66 produces. That is, spring 66 is selected so that it will not tolerate drive pressures above a predetermined maximum insufficient to cause wheel spinout at low vehicle speed, regardless of engine speed. As a result, system pressure, and thus wheel torque will not exceed the frictional tractive limit of the wheels under normal ground surface conditions, even when the vehicle is stationary or moving at low speed with the engine operating at high speeds.

With the foregoing transmission system, maximum drive system pressure and maximum wheel torque can be reached and determined for any engine speed, independent of vehicle speed. Thus, unlike a stroke controlled hydrostatic system, the illustrated pressure controlled system can develop a high wheel torque when the vehicle is stationary or moving slowly. The operator, in any case, selects and determines the torque desired through regulation of engine speed with his accelerator. The wheel torque developed by the operator through increases and decreases in engine speed determines the acceleration and speed of the vehicle, but both wheel torque and vehicle speed are obtained without requiring precise accelerator positioning by the operator. In this sense, the pressure-controlled hydrostatic transmission closely resembles the torque converter automatic transmission of an automobile.

Engine deceleration.—To decelerate, engine speed is reduced by letting up on the accelerator, the vehicle wheels 28 start driving the hydraulic motor 24 as a pump, and pump 14 in turn becomes a motor driving the engine. Under these conditions fluid pressure at the pump inlet and in line 30 is high, while pressure at the pump outlet and in line 22 is low. Thus the pressure in line 54 to the valve 52 is also low. At all engine speeds above idling speeds under these conditions, pressure compensator spring 66 holds valve 52 in its left-hand position to maintain pump displacement at maximum. Check valve 99 prevents the low pressure in line 22 and in line 54 from equaling or exceeding the minimum pressure setting of compensator spring 66 during this phase so that valve 52 will remain in its maximum displacement position. Thus during normal engine retardation the transmission stays in the equivalent of high gear until the engine slows down to its idling speed. This feature prevents any harsh or abusive deceleration such as would occur if the pump should be suddenly cut back to minimum displacement upon release of accelerator pressure.

At idling speeds the engine no longer retards since it drives itself at such speeds. Instead, as vehicle speed gets lower at engine idling speeds, the engine again drives the wheels, but at pressures too low to overcome rolling resistance. Therefore, vehicle speed continues to decrease. At these low engine speeds the setting of spring 66 is at a minimum and therefore even relatively low system pressures in line 22 will reduce pump displacement, thereby preventing any substantial buildup of driving pressure. At all vehicle speeds below those at which engine idle speed is reached, the operator feels as though he is free-wheeling since the vehicle is neither driving the engine nor being driven by it. As vehicle speed approaches zero, minimum pump displacement is also approached. The above sequence results in a very smooth stop, much like that of an automobile retarding in high gear until it reaches low engine speed.

Brake inching.—When the vehicle braking system is not in use, valve 72 is normally in its closed position shown, thereby having no effect on the displacement of pump 14. However, an increase in pressure in brake line 76 caused by application of the brakes, forces piston 77 toward the left in FIG. 2, increasing the pressure setting of spring 78 to connect valve 72 with lines 74 and 75 and thereby relieving pressure at piston 64. This in turn reduces the pressure setting of spring 66 and tends to shift valve 52 to the right to cut back displacement of pump 14. As a result, wheel driving pressure in line 22 is reduced to enable precise inching control with the vehicle brakes, regardless of the speed of engine 10, which could still be quite high to drive the hydraulic accessories.

Use of hydraulic accessories.—When control valve 84 for the hydraulic accessories is centered as shown, fluid pressure in line 82 is low because it is open to sump through the valve and line 86. With control valve 84 in this position, most of the power of engine 10 is available to drive pump 14 and thereby develop high driving pressure in line 22 to drive the vehicle. However, when control valve 84 is shifted to direct pressure fluid to one or several of hydraulic accessories 21, pressure in line 82 rises, and thus pressure in line 88 to piston 89 also rises. When pressure in lines 82 and 88 increases because of the demand of the hydraulic accessories to a level at which there is insufficient engine power available to drive both the vehicle and the accessories, piston 89 increases the pressure setting of spring 78 to a point at which the spring will shift relief valve 72 to relief pressure at compensator piston 64. This reduces the pressure setting of compensator spring 66 so that drive system pressure acting through line 54 can shift control valve 52 to cut back displacement of pump 14, thereby giving the hydraulic accessories 21 priority over the traction motor 24 in the use of available engine power.

Several modifications of the illustrated system could be made without affecting the operation of the system appreciably. For example, pressure compensator spring 66 could be eliminated altogether with piston 64 being in direct contact with or in fact an integral part of valve 52. Furthermore, if a high pressure control system were desired rather than a low pressure system as illustrated, fluid pressure from line 22 could be directed to the displacement varying cylinder 34 of pump 14 rather than low pressure fluid from line 42.

It should also be noted that use of the variable displacement pump 14 of the multiple piston type with common thrust plate control for all pistons or pumping agencies enables the use of a single pressure compensator control and displacement varying means to regulate the displacement of all of the various pumping agencies simultaneously, providing in effect a very simplified control.

In the described and illustrated circuit, a variable displacement pump capable of flow in only one direction is shown. However, it is important to point out that the principles illustrated with respect to the single-direction pump are just as applicable to an over-center or reversible variable displacement pump. Of course, with such a reversible pump the directional control valve would not be necessary, but additional circuitry would be required to operate the pressure compensator when the pump would be flowing in reverse direction.

Having illustrated and described the essentials of a preferred embodiment of my invention, it should be apparent to those skilled in the art that the same permits of modification in arrangement and detail. I claim as my invention all such modifications as come within the true spirit and scope of the following claims:

1. A control device for an engine-driven variable displacement fluid pump means having multiple pumping agencies, the displacement of each agency being infinitely variable between its minimum and maximum displacement conditions, said control device comprising:
   displacement-varying means for infinitely varying the displacement of all said agencies in unison through a predetermined displacement range,
   pressure-sensitive control means for operating said displacement-varying means in response to variations in a pressure produced by said pump means,
   and speed-sensitive modulating means acting on said control means independently of the pressure and the flow produced by said pump means in response to variations in the speed of said engine so as to modulate the operation of said displacement-varying means with changes in the engine speed in a manner so that the level of pressure produced by said pump means necessary to effect a change in pump displacement varies with engine speed.

2. A device according to claim 1 wherein:
said control means includes valve means for delivering pressure fluid to said displacement varying means or alternatively for relieving said displacement varying means of pressure fluid in response to variations in pump discharge pressure,
said speed-sensitive modulator means including speed translating means for translating speed changes of said engine to pressure variations, and variable pressure applying means for applying variable predetermined pressures to said valve means proportional to said pressure variations of said translating means.

3. A device according to claim 2 wherein:
said variable pressure applying means acts on said valve means in a manner so as to determine the magnitude of pump discharge pressure necessary to actuate said valve means, with said magnitude being variable with variations in engine speed.

4. A device according to claim 2 wherein said speed translating means includes means providing a fluid flow proportional to engine speed and fixed orifice means in said flow.

5. A device according to claim 1 wherein said control means acts on said displacement varying means in a manner tending to decrease pump displacement upon increases in said system pressure.

6. A device according to claim 5 wherein said modulating means acts on said control means in a manner tending to increase pump displacement upon increases in engine speed.

7. A device according to claim 1 wherein:
said control means includes single means acting on said displacement varying means in a manner tending to decrease the displacement of all said agencies simultaneously when said discharge pressure exceeds a predetermined magnitude,
said modulating means includes means sensitive to engine speed operable to vary said predetermined magnitude in response to variations in engine speed and independently of the displacement condition of said pump.

8. A device according to claim 1 wherein:
said control means is responsive to pump discharge pressure and acts on said displacement varying means to control pump discharge pressure by tending to decrease the displacement of all said agencies in unison when said discharge pressure exceeds a predetermined magnitude, and by tending to increase the displacement of all said agencies in unison when said discharge pressure is less than said magnitude,
said modulating means includes means responsive to engine speed operable to vary said predetermined magnitude in response to variations in engine speed and independently of pump discharge pressure,
whereby variations in pump displacement are a function of pump discharge pressure and engine speed throughout the entire range of pump discharge pressures.

9. A fluid transmission system comprising:
an engine,
variable displacement fluid pump means driven by said engine, said pump means having multiple pumping agencies, each having an infinitely variable displacement between minimum and maximum displacement conditions,
fluid motor means driven by pressure fluid from said pump means,
displacement-varying means for varying infinitely the displacement of said multiple pumping agencies in unison throughout a predetermined displacement range,
displacement control means sensitive to a pressure produced by said pump means for operating said displacement-varying means in response to changes in said pressure,
and condition-responsive modulating means operable to vary the magnitude of said pressure necessary to operate said control means independently of said pump displacement and independently of the pressure and flow produced by said pump means in response to a variable condition other than said pressure in a manner so that the level of pressure produced by said pump means necessary to effect a change in pump displacement varies with variations in said condition.

10. Apparatus according to claim 9 wherein said modulating means is sensitive to engine speed and is operable to vary said magnitude in response to variations in engine speed and independently of pump displacement.

11. A fluid transmission system comprising:
an engine,
variable displacement fluid pump means driven by said engine, said pump means having multiple pumping agencies, each having an infinitely variable displacement between minimum and maximum displacement conditions,
fluid motor means driven by pressure fluid from said pump means,
displacement-varying means for varying infinitely the displacement of said multiple pumping agencies in unison throughout a predetermined displacement range,
displacement control means sensitive to a pressure produced by said pump means for operating said displacement-varying means in response to changes in said pressure,
and condition-responsive modulating means operable to vary the magnitude of said pressure necessary to operate said control means independently of said pump displacement in response to a variable condition other than said pressure,
said modulating means being sensitive to engine speed and being operable to vary said magnitude in response to variations in engine speed and independently of pump displacement,
said control means being sensitive to the pressure produced by said pump means in a manner such that an increase in said pressure above said magnitude operates said control means in a manner tending to decrease the displacement of said multiple agencies in unison,
said modulating means being sensitive to engine speed in a manner such that an increase in engine speed tends to increase said magnitude, whereby pump displacement is a function of said pressure and engine speed.

12. A transmission system according to claim 9 wherein:
said displacement control means is responsive to the discharge pressure produced by said pump means for operating said displacement varying means in a manner tending to decrease the displacement of all said agencies in unison when said discharge pressure exceed said pressure magnitude,
said modulating means is operable to vary said magnitude independently of said pump displacement condition.

13. A transmission system according to claim 9 wherein said fluid motor means comprises a vehicle traction motor and said pump means and fluid pressure produced by said pump means transmits torque from said engine to said traction motor.

14. A fluid transmission system comprising:
an engine,
variable displacement fluid pump means driven by said engine, said pump means having multiple pumping agencies, each having an infinitely variable displacement between minimum and maximum displacement conditions,
fluid motor means driven by pressure fluid from said pump means, displacement-varying means for varying infinitely the displacement of said multiple pumping agencies in unison throughout a predetermined displacement range, displacement control means sensitive to a pressure produced by said pump means for operating said displacement-varying means in response to changes in said pressure, and condition-responsive modulating means operable to vary the magnitude of said pressure necessary to operate said control means independently of said pump displacement in response to a variable condition other than said pressure, said fluid motor means comprising a vehicle traction motor, said pump means and fluid pressure produced by said pump transmitting torque from said engine to said traction motor, vehicle brake means, said modulating means being sensitive to brake application force and tending to decrease said magnitude of pressure with increases in said brake application force.

15. Apparatus according to claim 14 wherein said modulating means is sensitive to engine speed and tends to increase said magnitude of pressure to tend to increase pump displacement upon increases in engine speed.

16. A fluid transmission system comprising:
an engine,
variable displacement fluid pump means driven by said engine, said pump means having multiple pumping agencies, each having an infinitely variable displacement between minimum and maximum displacement conditions, fluid motor means driven by pressure fluid from said pump means, displacement-varying means for varying infinitely the displacement of said multiple pumping agencies in unison throughout a predetermined displacement range, displacement control means sensitive to a pressure produced by said pump means for operating said displacement-varying means in response to changes in said pressure, and condition-responsive modulating means operable to vary the magnitude of said pressure necessary to operate said control means independently of said pump displacement in response to a variable condition other than said pressure, said control means including means responsive to pump inlet and outlet differential pressure and operable to effect maximum pump displacement when said inlet exceeds said discharge pressure.

17. Apparatus according to claim 14 wherein said modulating means is sensitive to engine speed and tends to increase said magnitude of pressure to tend to increase pump displacement upon increases in engine speed, said control means including means responsive to pump inlet and outlet differential pressure and operable to effect maximum pump displacement when said inlet pressure exceeds said discharge pressure.

18. A control device for controlling the transmission of torque from an engine-driven variable displacement pump to a hydraulic motor in a hydrostatic transmission, said control device including:

control means responsive to the pressure produced by said pump to reduce pump displacement when said pressure reaches a limit value, speed-sensing means responsive to the speed of said engine independently of the pressure or flow produced by said pump, said speed-sensing means including means acting on said control means in a manner to vary said pressure limit value with variations in engine speed.

19. Apparatus according to claim 9 wherein said variable condition comprises a variable force, means for applying said variable force, said modulating means being operable to vary said magnitude in response to variations in said force.

20. Transmission means for delivering torque from a driving engine to vehicle traction means to overcome a variable tractive resistance, said transmission means comprising:

variable displacement fluid pump means having multiple pumping agencies each having an infinitely variable displacement within a displacement range between minimum and maximum displacement conditions, displacement-varying means for varying infinitely and in unison the displacement of said multiple pumping agencies within said displacement range, displacement control means sensitive to pump discharge pressure for operating said displacement-varying means in a manner tending to decrease displacement of said multiple agencies in unison when said discharge pressure exceeds a predetermined magnitude, and tending to increase displacement of said multiple agencies in unison when said pressure is less than said predetermined magnitude, and modulating means operable to vary said predetermined magnitude, so that pump displacement is a function of said variable predetermined pressure magnitude throughout the entire range of said variable tractive resistance, said modulating means being sensitive to engine speed and being operable to vary said magnitude in response to variations in engine speed, said displacement control means being sensitive to discharge pressure in a manner such that an increase in said discharge pressure tends to operate said control means in a manner tending to decrease pump displacement, said modulating means being sensitive to engine speed in a manner such that an increase in engine speed tends to operate said control means in a manner tending to increase pump displacement throughout the tractive resistance range of said variable tractive resistance.

21. Vehicle transmission means comprising:
variable displacement fluid pump means operably interposed between vehicle engine means and vehicle traction means and capable of transmitting power in either direction between both said means, displacement varying means operable to vary infinitely the displacement of each pumping agency of said pump means within the range between minimum and maximum displacement, displacement control means responsive to pump discharge pressure and acting on said displacement varying means, said control means being operable to control pump discharge pressure by tending to decrease pump displacement when said discharge pressure exceeds a predetermined pressure magnitude, and by tending to increase pump displacement when said discharge pressure is less than said predetermined pressure magnitude, said displacement control means including modulating means operable to vary said predetermined pressure magnitude within a predetermined range, the minimum said pressure magnitude being substantially no higher than that discharge pressure required to overcome minimum tractive resistance to vehicle movement.

22. A transmission means according to claim 21 wherein said modulating means is sensitive to the speed of said engine and is operable to vary said magnitude of pressure in response to variations in engine speed.

23. Apparatus according to claim 21 including means operable to decrease said discharge pressure to a level below said minimum predetermined pressure magnitude whenever said vehicle traction means is transmitting power to said vehicle engine means, whereby at such time said displacement control means tends to increase pump displacement.

24. Vehicle transmission means comprising:
variable displacement fluid pump means operably interposed between vehicle engine means and vehicle traction means and capable of transmitting power in either direction between both said means,
and pump displacement control means for controlling the displacement of said pump means,
said control means including means operable to place said pump at maximum displacement automatically whenever said vehicle traction means is transmitting power to said vehicle engine means.

25. A control device for an engine-driven variable displacement pump comprising:
displacement varying means for varying the displacement of said pump means,
displacement control means for operating said displacement varying means,
said displacement control means including means responsive to the difference in pressure between pump inlet and pump discharge fluid and operable to cause said control means to increase displacement of said pump to maximum whenever the pressure of pump inlet fluid exceeds the pressure of pump discharge fluid.

26. A fluid transmission system comprising:
an engine,
variable displacement fluid pump means driven by said engine for transmitting a variable torque to a movable load, said pump means having an infinitely variable displacement between minimum and maximum displacement conditions,
displacement-varying means for varying infinitely the displacement of said pump means throughout a predetermined displacement range,
displacement control means sensitive to torque delivered to said load for operating said displacement-varying means in response to changes in said torque,
condition-responsive modulating means operable to vary the magnitude of said torque necessary to operate said control means independently of said pump displacement and independently of the pressure and flow produced by said pump means in response to a variable condition other than said torque in a manner so that the magnitude of torque necessary to effect a change in pump displacement varies with variations in said variable condition.

27. Apparatus according to claim 26 wherein said modulating means is sensitive to engine speed and is operable to vary said magnitude in response to variations in engine speed and independently of pump displacement.

28. Apparatus according to claim 26 wherein an increase in said torque above said magnitude operates said control means in a manner tending to decrease pump displacement and wherein an increase in engine speed tends to increase said magnitude, whereby pump displacement is a function of said torque and engine speed.

29. A control device for an engine-driven pump means comprising:
displacement varying means for infinitely varying the displacement of said pump means through a predetermined displacement range,
pressure-sensitive control means for operating said displacement varying means in response to variations in a pressure produced by said pump means,
speed sensitive modulating means acting on said control means in response to variations in the speed of said engine so as to modulate the operation of said displacement varying means with changes in engine speed,
load brake means, including means responsive to brake application force interconnecting said load brake means and said modulating means,
said modulating means being sensitive to brake application force in a manner tending to decrease the pressure produced by said pump means with increases in said brake application force.

30. A control device for an engine-driven pump means comprising:
displacement varying means for infinitely varying the displacement of said pump means through a predetermined displacement range,
pressure-sensitive control means for operating said displacement varying means in response to variations in a pressure produced by said pump means,
and speed sensitive modulating means acting on said control means in responsive to variations in the speed of said engine so as to modulate the operation of said displacement varying means with changes in engine speed,
said modulating means being operable in a manner tending to enable increases in said pressure produced by said pump means,
second pump means driven by said engine,
second fluid motor means driven by pressure fluid from said second pump means,
said modulating means being sensitive to fluid pressure produced by said second pump means in a manner tending to reduce the displacement of said first-mentioned pump means and thereby the pressure produced by said first-mentioned pump means upon increases in fluid pressure produced by said second pump means.

31. A fluid transmission system comprising:
an engine,
pump means driven by said engine,
fluid motor means driven by pressure fluid from said pump means,
displacement varying means for varying infinitely the displacement of said pump means throughout a predetermined displacement range,
displacement control means sensitive to a pressure produced by said pump means for operating said displacement varying means in response to changes in said pressure,
and condition-responsive modulating means operable to vary the magnitude of said pressure necessary to operate said control means independently of said pump displacement in response to a variable condition other than said pressure,
said pump means including a first variable displacement pump means and a second pump means,
said fluid motor means including a first vehicle traction motor means and a second motor means for operating equipment on said vehicle,
said first pump means supplying pressure fluid to said first motor means and said second pump supplying pressure fluid to said second motor means,
said displacement varying means being operable to vary the displacement of said first pump means,
said control means being sensitive to pressure produced by said first pump means in a manner tending to decrease displacement of said first pump means upon increases in said pressure,
said modulating means being sensitive to pressure produced by said second pump means in a manner tending to decrease the displacement of said first pump means upon increases in pressure produced by said second pump means.

32. A system according to claim 31 wherein said modulating means is responsive to engine speed in a manner tending to increase the displacement of said first pump means upon increases in engine speed.

References Cited

UNITED STATES PATENTS

| | | |
|---|---|---|
| 2,238,061 | 4/1941 | Kendrick. |
| 2,892,311 | 6/1959 | Van Gerpen. |
| 2,892,312 | 6/1959 | Allen et al. |
| 2,942,421 | 6/1960 | Hann et al. ---------- 60—19 |
| 3,054,263 | 9/1962 | Budzich et al. --------- 60—19 |
| 3,186,170 | 6/1965 | Gauthier et al. -------- 60—53 |
| 3,247,669 | 4/1966 | Hann ---------------- 60—19 |

EDGAR W. GEOGHEGAN, Primary Examiner

U.S. Cl. X.R.

60—52,53